United States Patent
Tai et al.

(10) Patent No.: US 8,295,043 B2
(45) Date of Patent: Oct. 23, 2012

(54) PROTECTIVE SLEEVE FOR PORTABLE ELECTRONIC DEVICES

(75) Inventors: Lone-Wen Tai, Taipei Hsien (TW); Jun Dai, Shenzhen (CH)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1053 days.

(21) Appl. No.: 12/106,334

(22) Filed: Apr. 21, 2008

(65) Prior Publication Data
US 2009/0111543 A1    Apr. 30, 2009

(30) Foreign Application Priority Data
Oct. 31, 2007    (CN) .......................... 2007 1 0202349

(51) Int. Cl.
*G06F 1/16*    (2006.01)
*H05K 5/00*    (2006.01)
*H05K 7/00*    (2006.01)

(52) U.S. Cl. ............. 361/679.56; 455/575.3; 455/575.4; 455/575.8

(58) Field of Classification Search ............. 361/679.02, 361/679.55, 679.56; 455/575.1–575.4, 575.8; 206/320
See application file for complete search history.

(56) References Cited

U.S. PATENT DOCUMENTS

| | | | | |
|---|---|---|---|---|
| 5,548,478 A | * | 8/1996 | Kumar et al. | 361/679.27 |
| 5,586,002 A | * | 12/1996 | Notarianni | 361/679.26 |
| 5,900,848 A | * | 5/1999 | Haneda et al. | 345/1.1 |
| 5,956,625 A | * | 9/1999 | Hansen et al. | 455/575.4 |
| 6,009,338 A | * | 12/1999 | Iwata et al. | 455/575.4 |
| 6,208,874 B1 | * | 3/2001 | Rudisill et al. | 455/575.4 |
| 6,341,061 B1 | * | 1/2002 | Eisbach et al. | 361/679.46 |
| 6,351,372 B1 | * | 2/2002 | Kim | 361/679.15 |
| 6,370,362 B1 | * | 4/2002 | Hansen et al. | 455/90.1 |
| 6,480,374 B1 | * | 11/2002 | Lee | 361/679.17 |
| 6,489,949 B1 | * | 12/2002 | Yin | 345/168 |
| 6,542,721 B2 | * | 4/2003 | Boesen | 455/553.1 |
| 6,614,722 B2 | * | 9/2003 | Polany et al. | 367/131 |
| 6,648,534 B2 | * | 11/2003 | Chen | 400/715 |
| 6,771,493 B2 | * | 8/2004 | Chen | 361/679.11 |
| 6,782,242 B1 | * | 8/2004 | Koleda et al. | 455/90.3 |
| 6,819,549 B1 | * | 11/2004 | Lammers-Meis et al. | 361/679.55 |
| 6,842,626 B1 | * | 1/2005 | Kubo et al. | 455/550.1 |
| 6,862,171 B1 | * | 3/2005 | Maskatia et al. | 361/679.06 |
| 6,892,082 B2 | * | 5/2005 | Boesen | 455/575.3 |
| 6,914,774 B1 | * | 7/2005 | Albertini et al. | 361/679.09 |
| 6,950,516 B2 | * | 9/2005 | Pirila et al. | 379/433.12 |

(Continued)

FOREIGN PATENT DOCUMENTS

CN    2245786    1/1997

(Continued)

*Primary Examiner* — Adrian S Wilson

(74) *Attorney, Agent, or Firm* — Altis Law Group, Inc.

(57) ABSTRACT

The present invention relates to a protective sleeve for portable electronic devices. The protective sleeve for portable electronic device includes a sleeve frame, a cover, and a turning structure. The sleeve frame includes a plurality of connecting sidewalls cooperatively defining a space for receiving the portable electronic device. The cover is covering the space of sleeve frame. The cover is connected to the sleeve frame and can be opened via the turning structure. The protective sleeve for portable electronic device is convenient for use, and can fully protect the portable electronic device.

13 Claims, 7 Drawing Sheets

U.S. PATENT DOCUMENTS

| | | | |
|---|---|---|---|
| 6,980,777 B2* | 12/2005 | Shepherd et al. | 455/90.3 |
| 6,999,805 B2* | 2/2006 | Gartrell et al. | 455/575.8 |
| 7,027,846 B2* | 4/2006 | Pan | 455/575.3 |
| 7,031,758 B2* | 4/2006 | Chang | 455/575.1 |
| 7,054,441 B2* | 5/2006 | Pletikosa | 379/433.12 |
| 7,065,835 B2* | 6/2006 | Kuramochi | 16/357 |
| 7,106,579 B2* | 9/2006 | Maskatia et al. | 361/679.28 |
| 7,107,084 B2* | 9/2006 | Duarte et al. | 455/575.3 |
| 7,194,086 B2* | 3/2007 | Pletikosa | 379/433.12 |
| 7,203,532 B2* | 4/2007 | Pan | 455/575.3 |
| 7,248,904 B2* | 7/2007 | Gartrell et al. | 455/575.8 |
| 7,324,642 B2* | 1/2008 | Pletikosa | 379/433.12 |
| 7,400,917 B2* | 7/2008 | Wood et al. | 455/575.8 |
| 7,480,524 B2* | 1/2009 | Moon et al. | 455/575.4 |
| 7,539,526 B2* | 5/2009 | Pirila et al. | 455/575.3 |
| 7,558,594 B2* | 7/2009 | Wilson | 455/550.1 |
| 7,561,203 B2* | 7/2009 | Pistemaa et al. | 348/375 |
| 7,586,539 B2* | 9/2009 | Chiang | 348/376 |
| 7,633,745 B2* | 12/2009 | Sakakibara et al. | 361/679.11 |
| 7,639,479 B2* | 12/2009 | Chuang et al. | 361/679.06 |
| 8,185,173 B2* | 5/2012 | Kim | 455/575.4 |
| 2002/0071550 A1* | 6/2002 | Pletikosa | 379/433.01 |
| 2002/0085338 A1* | 7/2002 | Lin | 361/680 |
| 2002/0086702 A1* | 7/2002 | Lai et al. | 455/556 |
| 2002/0132633 A1* | 9/2002 | Johnson et al. | 455/550 |
| 2003/0068035 A1* | 4/2003 | Pirila et al. | 379/447 |
| 2003/0104850 A1* | 6/2003 | Lai et al. | 455/575 |
| 2003/0109230 A1* | 6/2003 | Duarte et al. | 455/90 |
| 2003/0142469 A1* | 7/2003 | Ponx | 361/683 |
| 2003/0160754 A1* | 8/2003 | Hanson et al. | 345/156 |
| 2003/0184958 A1* | 10/2003 | Kao | 361/683 |
| 2003/0202656 A1* | 10/2003 | Ikeuchi et al. | 379/419 |
| 2005/0044665 A1* | 3/2005 | Kuramochi | 16/341 |
| 2005/0079738 A1* | 4/2005 | Ahn | 439/1 |
| 2005/0139498 A1* | 6/2005 | Goros | 206/320 |
| 2005/0221873 A1* | 10/2005 | Kameyama et al. | 455/575.4 |
| 2006/0128449 A1* | 6/2006 | Park | 455/575.4 |
| 2006/0186001 A1* | 8/2006 | Anderson et al. | 206/320 |
| 2006/0211458 A1* | 9/2006 | Pletikosa | 455/575.3 |
| 2006/0252471 A1* | 11/2006 | Pan | 455/575.4 |
| 2006/0256960 A1* | 11/2006 | Bae et al. | 379/433.11 |
| 2006/0279924 A1* | 12/2006 | Richardson et al. | 361/683 |
| 2007/0049365 A1* | 3/2007 | Norris et al. | 455/575.8 |
| 2007/0139873 A1* | 6/2007 | Thomas et al. | 361/681 |
| 2007/0217135 A1* | 9/2007 | Chuang et al. | 361/681 |
| 2007/0247793 A1* | 10/2007 | Carnevali | 361/681 |
| 2008/0096620 A1* | 4/2008 | Lee et al. | 455/575.8 |
| 2009/0054114 A1* | 2/2009 | Ozawa | 455/575.4 |
| 2009/0061956 A1* | 3/2009 | Matsuoka | 455/575.1 |
| 2009/0074255 A1* | 3/2009 | Holm | 382/115 |

FOREIGN PATENT DOCUMENTS

| | | |
|---|---|---|
| CN | 2524447 | 12/2002 |
| CN | 1728732 | 2/2006 |
| TW | I280030 | 4/2007 |

* cited by examiner

PROTECTIVE SLEEVE FOR PORTABLE ELECTRONIC DEVICES

CROSS-REFERENCE TO RELATED APPLICATIONS

This application is related to a co-pending U.S. patent applications, applications Ser. No. 12/106,335, both entitled "PROTECTIVE SLEEVE FOR PORTABLE ELECTRONIC DEVICES", wherein the inventor is Lone-Wen Tai and Jun Dai. Such applications have the same assignee as the present application and have been concurrently filed herewith. The disclosures of the above identified applications are incorporated herein by reference.

BACKGROUND OF THE INVENTION

1. Field of the Invention

The present invention relates generally to protective sleeves and, more particularly to a protective sleeve used for portable electronic devices.

2. Discussion of the Related Art

Portable electronic devices such as mobile phones, media players, or personal digital assistants (PDAs) are very popular and widely used. A variety of protective sleeves for protecting the portable electronic devices are also popularly used, these includes shock-proof packages, silica gel sleeves, colored plastic sleeves, leather sleeves, and so on. Although the protective sleeves can protect the portable electronic devices from shock or abrasion, they do have disadvantages.

For example, before using the portable electronic devices, it has to be taken out of the shock-proof package or the leather sleeve. Thus, it is an inconvenient to use the shock-proof package or the leather sleeve. Furthermore, once removed from the protective device, the portable electronic devices are no longer protected. Thus, the shock-proof package or the leather sleeve is useless when the phone is in use. Similarly, it is an inconvenient to place silica gel sleeve or colored plastic sleeve over the portable electronic device. In addition, the silica gel sleeve or the colored plastic sleeve must include an opening to expose a screen of the portable electronic devices, such that the silica gel sleeve or the colored plastic sleeve cannot fully protect the portable electronic devices.

What is needed, therefore, is a new protective sleeve that overcomes the above mentioned disadvantages.

SUMMARY

In one aspect, a protective sleeve for a portable electronic device includes a sleeve frame and a cover. The sleeve frame includes four connecting sidewalls cooperatively defining a space for receiving the portable electronic device. The sleeve frame further includes two latching grooves defined in outer surfaces of the two opposite sidewalls. A pair of latching hooks extends out from opposite edges of the cover corresponding to the latching grooves. Each of the latching hooks is configured to be slidably engaged in each latching grooves of the sleeve frame correspondingly, such that the cover is connected to the sleeve frame and can slide along the latching grooves.

In another aspect, a protective sleeve for a portable electronic device includes a sleeve frame and a cover. The sleeve frame includes four connecting sidewalls cooperatively defining a space for receiving the portable electronic device. The cover defines two through holes adjacent to an edge of the cover. The C-shaped latching rings assembled into the through holes of the cover, and two ends of each of the C-shaped latching rings are fixed on a sidewall of the sleeve frame. Thus, the cover is connected to the sleeve frame and can turn along the two C-shaped latching rings.

In still another aspect, a protective sleeve for a portable electronic device includes a sleeve frame and a cover. The sleeve frame includes four connecting sidewalls cooperatively defining a space for receiving the portable electronic device The two connecting rods are symmetrically opposite of each other. An end of each connecting rod is rotatably connected on an edge of the cover via a pin. Another end of each connecting rod is rotatably connected on a sidewall of the sleeve frame via a pin. Thus, the cover is connected to the sleeve frame and can turn to open via the two connecting rods.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present protective sleeve for portable electronic device. Moreover, in the drawings, like reference numerals designate corresponding parts throughout the several views.

DETAILED DESCRIPTION OF THE EMBODIMENTS

Reference will now be made to the drawings to describe preferred embodiments of the present protective sleeve for portable electronic device, in detail. The present protective sleeve for portable electronic device can be used in mobile phones.

Figure 1:
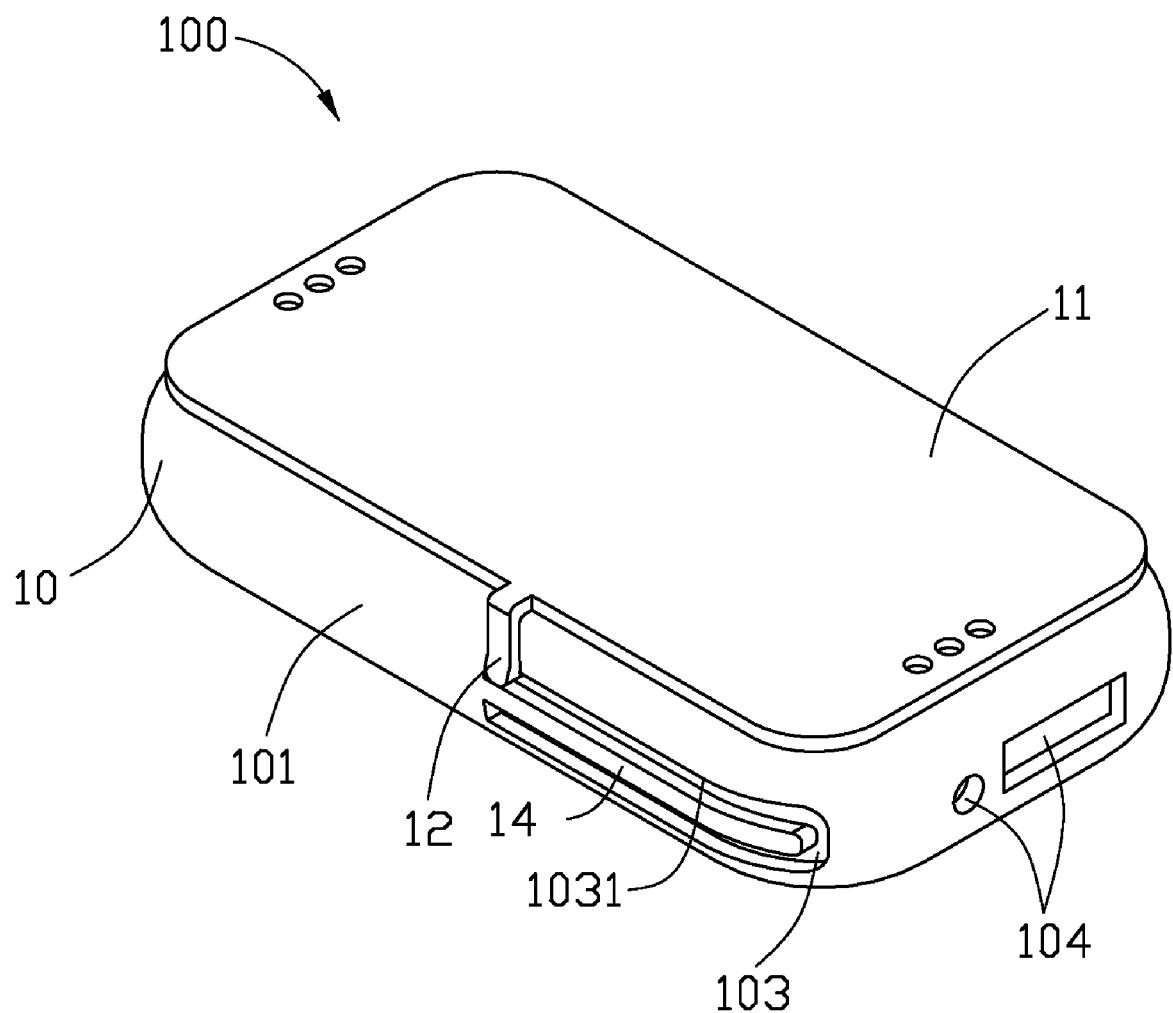
FIG. 1 is an assembled, isometric view of a protective sleeve for a portable electronic device in accordance with a first preferred embodiment of the present invention.
Figure 2:
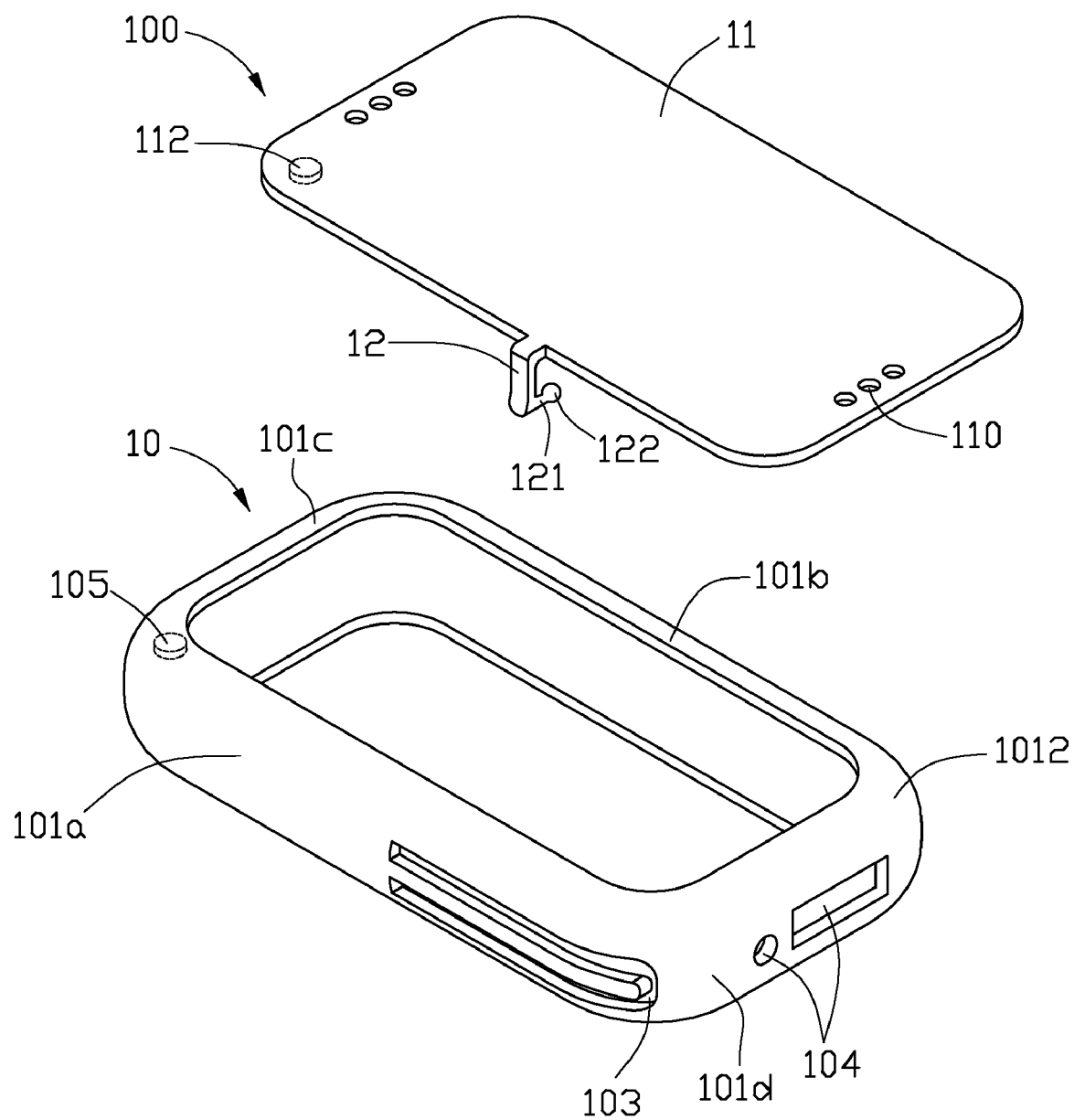
FIG. 2 is an exploded, isometric view of the protective sleeve of FIG. 1.
Figure 3:
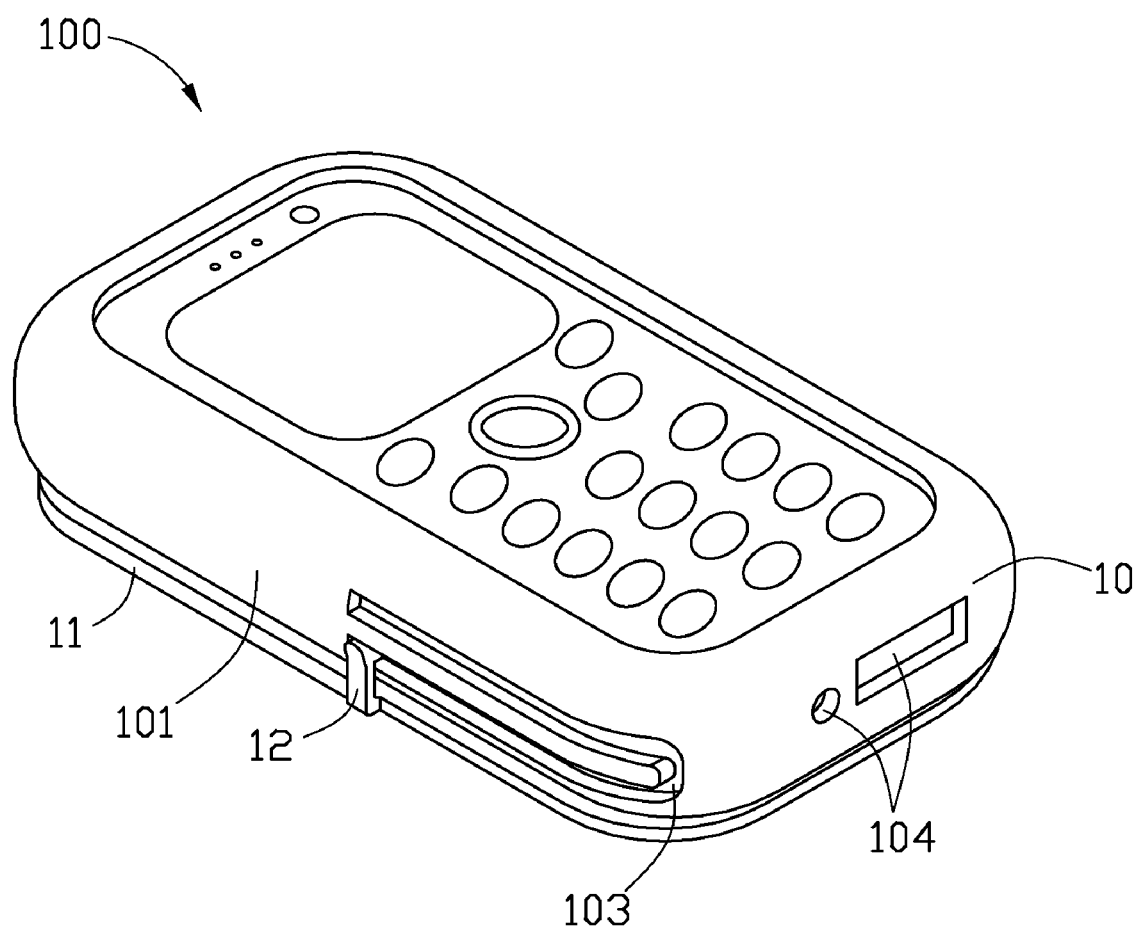
FIG. 3 is an assembled, isometric view of the protective sleeve of FIG. 1 assembled with the portable electronic device.

Referring to FIGS. 1 through 3, a protective sleeve 100 for a portable electronic device of a first preferred embodiment is shown. The protective sleeve 100 includes a sleeve frame 10 and a cover 11. The sleeve frame 10 includes four connecting sidewalls 101, consisting of a first sidewall 101a, second sidewall 101b, top sidewall 101c and a bottom side wall 101d, cooperatively defining a space for receiving a mobile phone. Latitudinal medial cross-sections of each of the sidewalls 101, are substantially C-shaped. The sidewalls 101a, 101b are on opposite sides of the protective sleeve 100 and each defines a latching groove 103 on the outer surface correspondingly. The latching grooves 103 are U-shaped with the bend of the "U" adjacent the bottom sidewall 101d. Furthermore, the latching grooves are substantially mirror images of each other. A tongue 14 extends in each latching groove 103 from an end of the latching groove 103 towards the other end of the latching groove 103, such that each latching groove 103 is shaped as U-shaped.

The cover 11 is a transparent plate that can be made of transparent plastic or glass. A pair of latching hooks 12 extends out from opposite edges of the cover 11 corresponding to the latching grooves 103. Each latching hook 12 is partially positioned between the tongue 14 and a sidewall 1031 defining the latching groove 103. The pair of latching hooks 12 are disposed at a middle portion of the edges of the cover 11 correspondingly and are also mirror images of each other. Each of the latching hooks 12 has a substantially L-shape and an end of each of the latching hooks 12 forms a spherical portion 122. The spherical portion 122 of each of the latching hooks 12 is configured to be slidably engaged in each of the latching grooves 103 of the sleeve frame 10 correspondingly, such that the cover 11 is connected to the sleeve frame 10 and can slide along the latching grooves 103.

The sleeve frame 10 further includes two through holes 104 defined in the bottom sidewall 101d of the sleeve frame 10 corresponding to an earphone jack and a charger socket, respectively, of the mobile phone. As such, the earphone or the charger can be used when the mobile phone is in the space of the sleeve frame 10. The cover 11 further includes a reflection reducing coating (not shown) deposited on an inner surface of a portion of the cover 11 corresponding to a screen of the mobile phone. As such, the transparency of the cover 11 is increased due to the reflection reducing coating. The cover 11 also includes a plurality of through holes 110 defined in portions of cover 11 corresponding to a speaker and a microphone, respectively, of the mobile phone. As such, the speaker and the microphone can be used when the mobile phone is in the space of the sleeve frame 10.

The sleeve frame 10 further includes at least one first magnetic member 105 disposed on top of the first sidewall 101a. The cover 11 further includes at least one second magnetic member 112 disposed on a bottom surface of the cover 11 corresponding to the first magnetic member 105. When the cover 11 slides to a position such that the second magnetic member 112 of the cover 11 is aligned with the first magnetic member 105 of the sleeve frame 10, the cover 11 can be latched on the sleeve frame 10 tightly by a magnetic force produced between the first and second magnetic members 105, 112.

In this embodiment, the sleeve frame 10 is integrally formed by embed-molding technology. The four sidewalls 101 of the sleeve frame 10 are made of plastic materials reinforced by rigid materials, except that at least two opposite corners 1012 of the four sidewalls 101 are only made of plastic materials. Thus, the sleeve frame 10 can resiliently deform at the corners 1012. It is convenient to place the sleeve frame 10 over the mobile phone, and the sleeve frame 10 can accommodate mobile phones having different sizes. In addition, preferably, corners of the sleeve frame 10 and the cover 11 are rounded. Thus, the protective sleeve 100 for portable electronic device has a good appearance.

It should be understood that, the spherical portion 122 can be omitted. In an alternative embodiment, each of the latching hooks 12 defines a ring-shaped engaging groove around its distal end. The ring-shaped engaging groove of each of the latching hooks 12 is configured to be slidably engaged with each of the latching grooves 103 of the sleeve frame 10 correspondingly. Alternatively, the latching grooves 103 can be strip elongated in shape.

Figure 4:
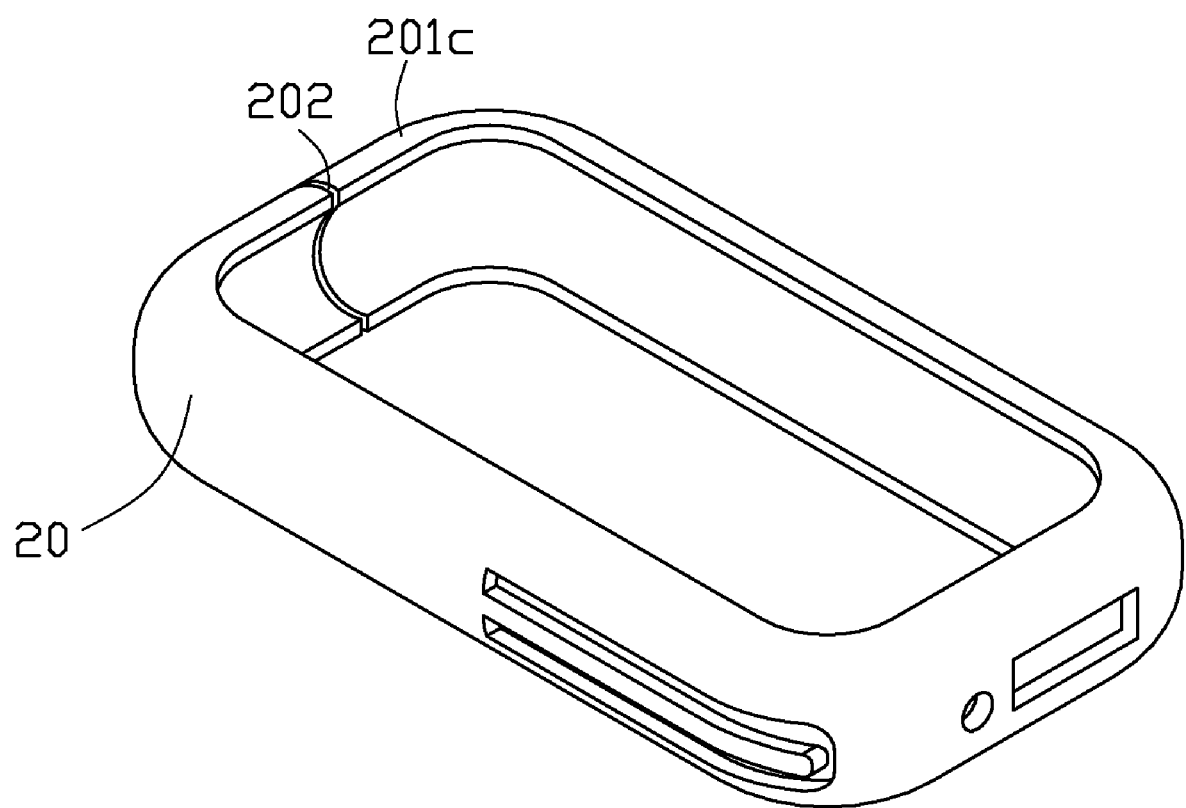
FIG. 4 is an isometric view of a sleeve frame of a protective sleeve in accordance with a second preferred embodiment of the present invention.

Referring to FIG. 4, a sleeve frame 20 of a protective sleeve in accordance with a second preferred embodiment of the present invention is shown. The sleeve frame 20 is similar as principle to the sleeve frame 10 of the first embodiment. However, the sleeve frame 20 further includes a slit 202 defined in a top sidewall 201c of the sleeve frame 20. The slit 202 runs through the top sidewall 201c of the sleeve frame 20, such that the top sidewall 201c of the sleeve frame 20 can be divided into two parts. The sleeve frame 20 is made of rigid materials with a certain elasticity. In use, the sleeve frame 20 is placed over the mobile phone by pulling the slit 202 wider, and the slit 202 would recover, thereby the sleeve frame 20 receiving the mobile phone tightly.

Figure 5:
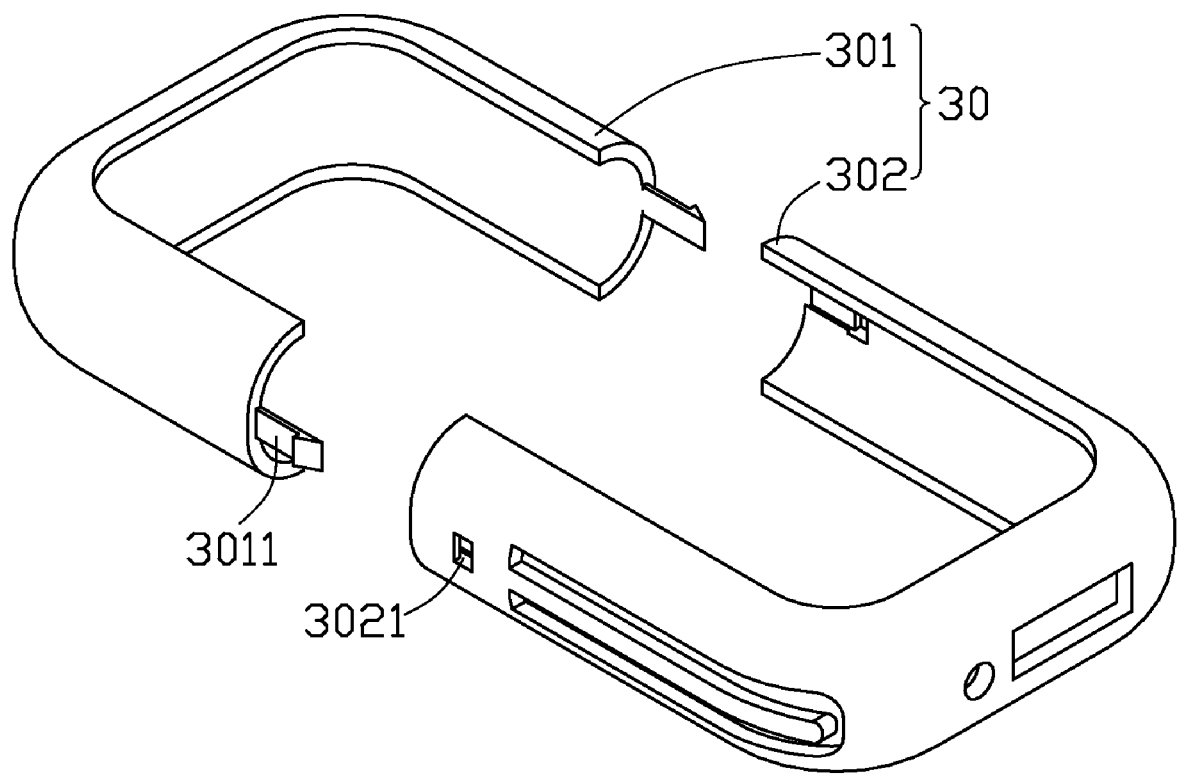
FIG. 5 is an isometric view of a sleeve frame of a protective sleeve in accordance with a third preferred embodiment of the present invention.

Referring to FIG. 5, a sleeve frame 30 of a protective sleeve in accordance with a third preferred embodiment of the present invention is shown. The sleeve frame 30 is similar in principle to the sleeve frame 10 of the first embodiment. However, the sleeve frame 30 includes a first frame 301 and a second frame 302. A pair of latching pins 3011 are formed on two ends of the first frame 301 and the second frame 302 defines a pair of latching holes 3021 adjacent to its two ends. The pair of the latching pins 3011 of the first frame 301 are engaged into the pair of latching holes 3021 of the second frame 302. Thus, the first frame 301 and the second frame 302 are connected with each other to form the sleeve frame 30.

Figure 6:
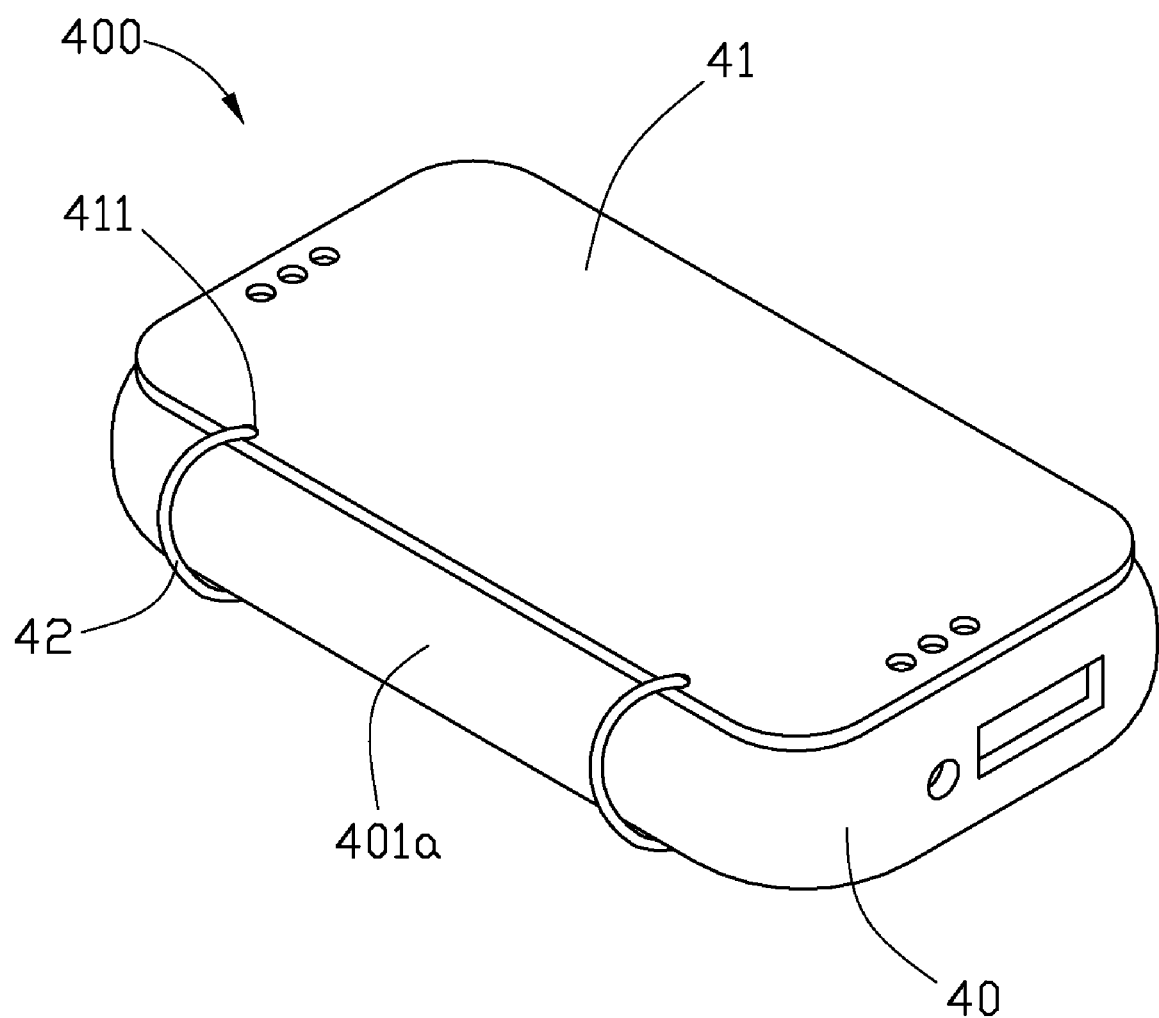
FIG. 6 is an assembled, isometric view of a protective sleeve in accordance with a fourth preferred embodiment of the present invention.

Referring to FIG. 6, a protective sleeve 400 for a portable electronic device in accordance with a fourth preferred embodiment of the present invention is shown. The protective sleeve 400 for portable electronic device is similar in principle to the protective sleeve 100 for portable electronic device of the first embodiment. However, the protective sleeve 400 includes two C-shaped latching rings 42 for movably connecting a cover 41 and a sleeve frame 40. The cover 41 defines two through holes 411 adjacent to an edge of the cover 41. The C-shaped latching rings 42 assembled into the through holes 411 of the cover 41. Simultaneously, two ends of each of the C-shaped latching rings 42 are fixed on a first sidewall 401a of the sleeve frame 40 by bolting, welding, or adhesive substances.

Figure 7:
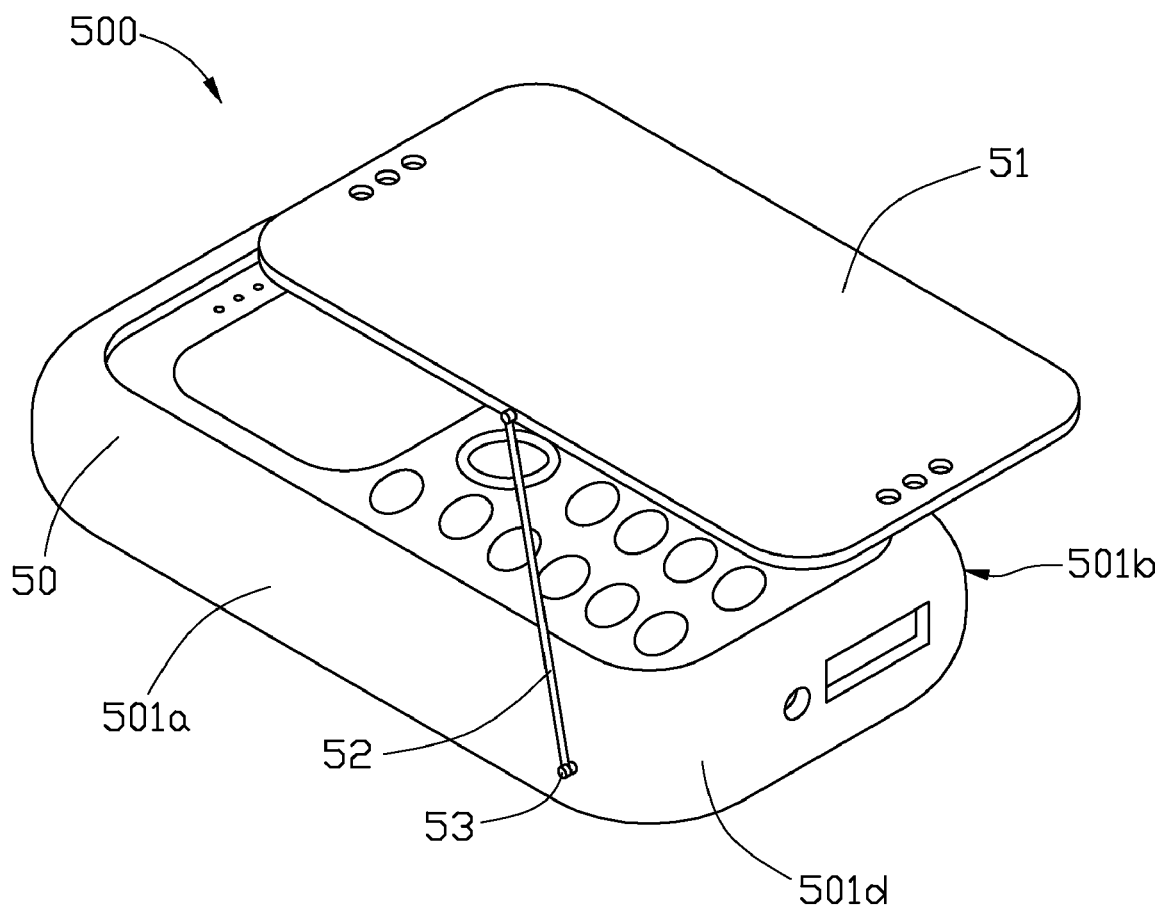
FIG. 7 is an isometric view of a protective sleeve assembled with a portable electronic device in accordance with a fifth preferred embodiment of the present invention.

Referring to FIG. 7, a protective sleeve 500 for portable electronic device in accordance with a fifth preferred embodiment of the present invention is shown. The protective sleeve 500 for portable electronic device is similar in principle to the protective sleeve 100 for portable electronic device of the first embodiment. However, the protective sleeve 500 includes two connecting rods 52 for movably connecting a cover 51 and a sleeve frame 50. The two connecting rods 52 are symmetrically opposite to each other. An end of each of the connecting rods 52 is rotatably connected on a middle portion of an edge of the cover 51 via a pin 53. Another end of each of the connecting rods 52 is rotatably connected on the edge of a first sidewall 501a or a second sidewall 501b adjacent a bottom sidewall 501d via a pin 53.

The protective sleeve frame and the cover covers the screen and keyboard of the mobile phone completely. Thus, the protective sleeve for portable electronic device can fully protect the mobile phone. When an external force is applied to the cover, the cover can be open and reveal the screen and keyboard of the mobile phone. In addition, the cover can also be moved to another side of the sleeve frame. In other words, the cover can be turn to a back side of the mobile phone by a turning structure such as a pair of latching hooks and two latching grooves, two C-shaped latching rings, or two connecting rods described in above embodiments. So, it is convenient to use the protective sleeve for the portable electronic device.

It should be understood that, the cover can also be designed to include two separate covers, for protecting the screen and keyboard of the mobile phone respectively. The cover can further have an interlayer for enclosing photographs, pictures, and so on. The sleeve frame can further have a ring formed at a corner for suspending a decoration, a key, and so on. In addition, the sleeve frame can further include a bottom plate to protect the back of the mobile phone. The bottom plate can define a latch on an outer surface and the latch can be used as a carrying means for the protective sleeve of the portable electronic device.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A protective sleeve for portable electronic devices, the protective sleeve comprising:
    a sleeve frame including a plurality of connecting sidewalls defining a space for receiving the portable electronic device;
    a cover for covering the space of the sleeve frame; and
    a turning structure, the cover movably connected to the sleeve frame via the turning structure, wherein the turning structure comprises two latching grooves defined in outer surfaces of two opposite sidewalls of the sleeve frame respectively; and a pair of latching hooks extending out from opposite edges of the cover corresponding the latching grooves; the latching grooves are U-shaped and run through the sleeve frame, a tongue extends in each latching groove from an end of the latching groove, and each latching hook is partially positioned between the tongue and a sidewall defining the latching groove.

2. The protective sleeve for portable electronic devices as claimed in claim 1, wherein each of the latching hooks is substantially L-shaped and an end of each of the latching hooks forms a spherical portion; the spherical portion is slidably engaged in each of the latching grooves.

3. The protective sleeve for portable electronic devices as claimed in claim 1, wherein each of the latching hooks is substantially L-shaped and an end of each of the latching hooks defining a ring-shaped engaging groove; the ring-shaped engaging groove is slidably engaged with each of the latching grooves.

4. The protective sleeve for portable electronic devices as claimed in claim 1, wherein the sleeve frame further comprises at least one first magnetic member disposed on top of the sidewalls; the cover further comprises at least one second magnetic member disposed on a bottom surface corresponding to the at least one first magnetic member.

5. The protective sleeve for portable electronic devices as claimed in claim 1, wherein the sidewalls of the sleeve frame are made of plastic materials reinforced by rigid materials, except that at least two opposite corners of the sidewalls are made of plastic materials.

6. The protective sleeve for portable electronic devices as claimed in claim 1, wherein a latitudinal medial cross-sections of each of the sidewalls are substantially C-shaped.

7. The protective sleeve for portable electronic devices as claimed in claim 1, wherein the cover is a transparent plate.

8. The protective sleeve for portable electronic devices as claimed in claim 1, wherein the cover further comprises a reflection reducing coating deposited on an inner surface of a portion of the cover corresponding to a screen of the portable electronic device received in the space of the sleeve frame.

9. The protective sleeve for portable electronic devices as claimed in claim 1, wherein the sleeve frame further comprises a plurality of through holes defined in portions of the sleeve frame corresponding to an earphone jack and a charger socket of the portable electronic device received in the space of the sleeve frame.

10. The protective sleeve for portable electronic devices as claimed in claim 1, wherein the cover further comprises a plurality of through holes defined in portions of the cover corresponding to a speaker and a microphone of the portable electronic device received in the space of the sleeve frame.

11. The protective sleeve for portable electronic devices as claimed in claim 1, wherein the sleeve frame defines a slit in the sidewall, the slit running through the sidewall of the sleeve frame.

12. The protective sleeve for portable electronic devices as claimed in claim 1, wherein the sleeve frame comprises a first frame and a second frame, the first frame defining a pair of latching pins on two ends of the first frame and the second frame defining a pair of latching holes adjacent to two ends of the second frame; the pair of the latching pins of the first frame are engaged into the pair of latching holes of the second frame.

13. The protective sleeve for portable electronic devices as claimed in claim 1, wherein corners of the sleeve frame and the cover are rounded.

* * * * *